United States Patent [19]

Heath

[11] Patent Number: 5,941,069

[45] Date of Patent: *Aug. 24, 1999

[54] EXHAUST APPARATUS

[75] Inventor: Edward H. Heath, Madison, Conn.

[73] Assignee: Madison Combustion Associates, Madison, Conn.

[*] Notice: This patent is subject to a terminal disclaimer.

[21] Appl. No.: 08/693,867

[22] Filed: Aug. 5, 1996

Related U.S. Application Data

[63] Continuation-in-part of application No. 08/141,408, Oct. 22, 1993, Pat. No. 5,542,249.

[51] Int. Cl.[6] .................................................. F02B 35/00
[52] U.S. Cl. ............................. 60/307; 60/308; 60/315
[58] Field of Search ............................... 60/307, 308, 315

[56] References Cited

U.S. PATENT DOCUMENTS

| | | |
|---|---|---|
| 1,286,365 | 12/1918 | Loomis . |
| 2,606,573 | 8/1952 | Brobeck et al. . |
| 2,649,685 | 8/1953 | Cohen . |
| 2,803,309 | 8/1957 | Baker ........................................ 60/308 |
| 2,806,347 | 9/1957 | Pertile ........................................ 60/307 |
| 3,017,948 | 1/1962 | Shepherd et al. . |
| 3,314,230 | 4/1967 | Vanderpoel . |
| 3,390,520 | 7/1968 | Mattson . |
| 3,538,685 | 11/1970 | Breman . |
| 3,593,499 | 7/1971 | Kile . |
| 3,666,442 | 5/1972 | Rossel . |
| 3,683,625 | 8/1972 | McCrink . |
| 3,768,259 | 10/1973 | Carnahan et al. . |
| 3,805,523 | 4/1974 | Tanasawa . |
| 3,939,654 | 2/1976 | Creps . |
| 4,012,907 | 3/1977 | Crayton . |
| 4,475,512 | 10/1984 | Suzuki et al. . |
| 4,707,987 | 11/1987 | Atkin . |
| 4,912,927 | 4/1990 | Billington ............................... 60/315 |
| 5,012,641 | 5/1991 | Travalee . |
| 5,286,164 | 2/1994 | Goehre et al. ........................... 60/307 |
| 5,542,249 | 8/1996 | Heath ....................................... 60/315 |

FOREIGN PATENT DOCUMENTS

| | | |
|---|---|---|
| 0197806 | 6/1978 | Germany . |
| 3503501 | 8/1986 | Germany ................................. 60/315 |
| 1402684 | 6/1988 | Russian Federation . |
| 507710 | 6/1939 | United Kingdom . |
| 699923 | 11/1953 | United Kingdom . |
| 737128 | 9/1955 | United Kingdom . |
| 9110817 | 7/1991 | WIPO . |

*Primary Examiner*—Marguerite McMahon
*Attorney, Agent, or Firm*—Bachman & Lapointe, P.C.

[57] ABSTRACT

An exhaust apparatus for a combustion engine having a combustion chamber and an exhaust pipe for conveying exhaust gas in an exhaust stream from the combustion chamber is disclosed, wherein the exhaust apparatus includes a fan member disposed downstream of the combustion chamber and substantially sealingly associated with the exhaust pipe and an air inlet for introducing air relative to the fan member whereby the fan member is driven by the exhaust stream and air so as to create an area of low pressure between the fan member and the combustion chamber whereby extraction of exhaust gas from the combustion chamber is facilitated.

21 Claims, 3 Drawing Sheets

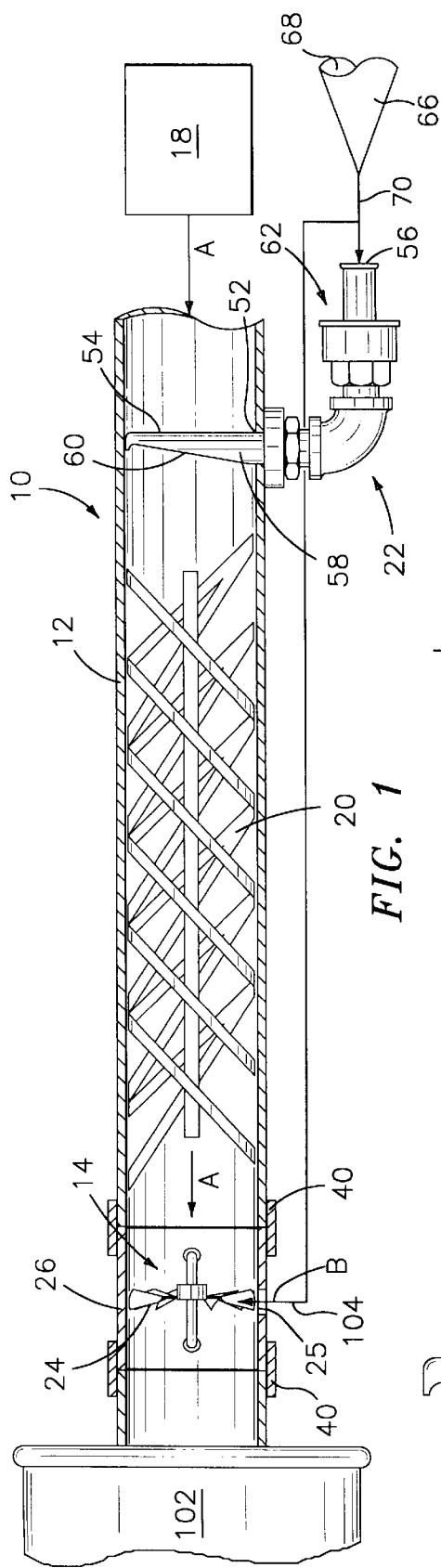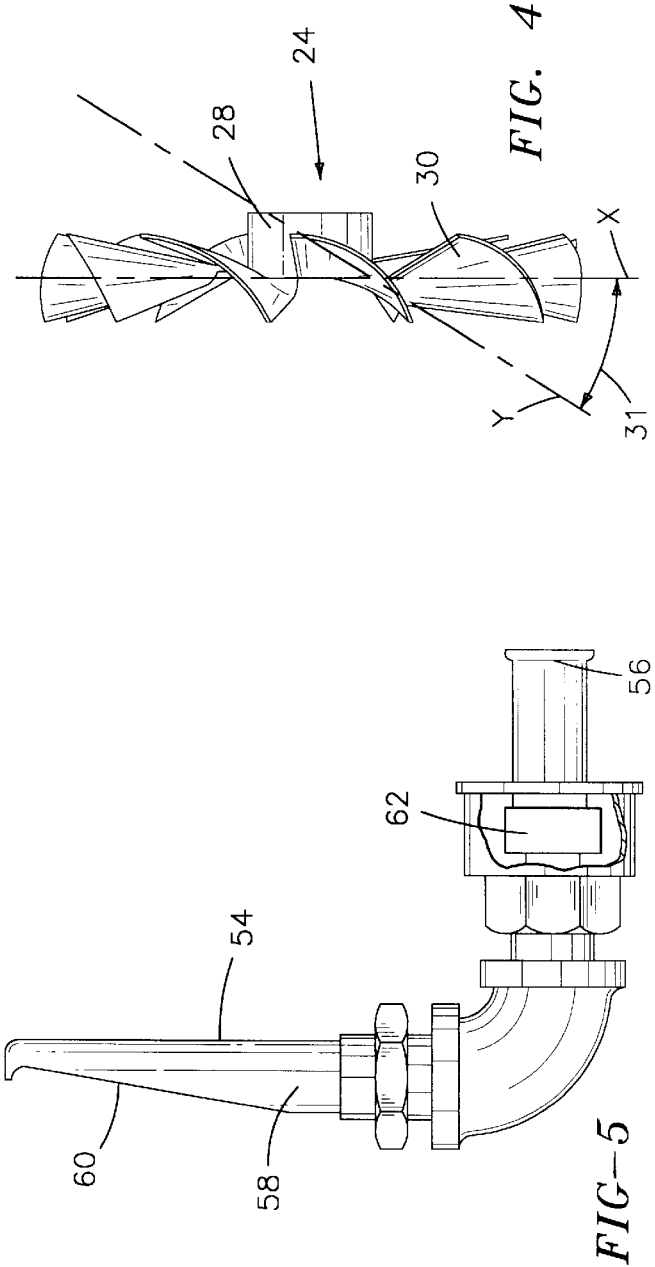

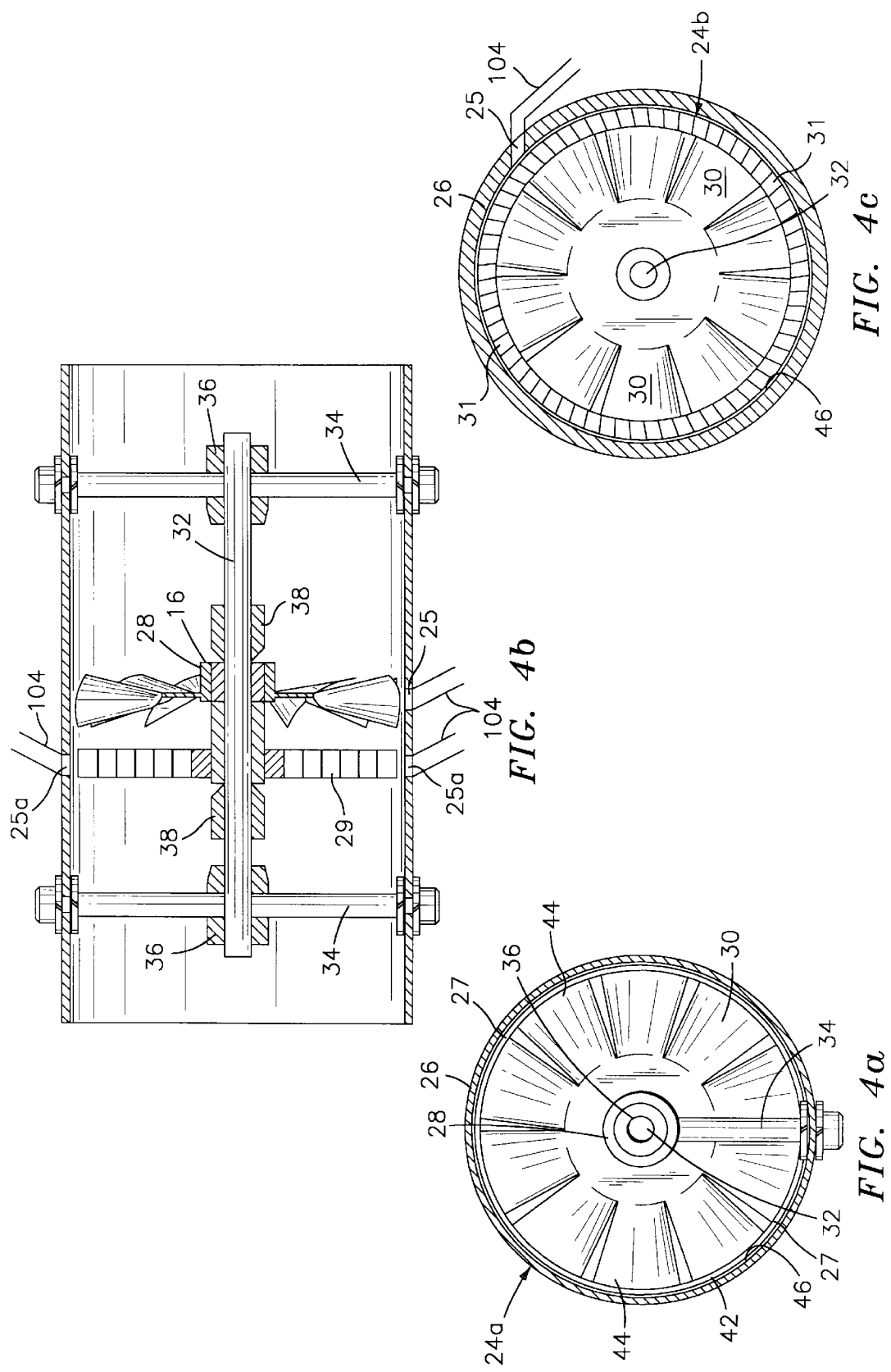

EXHAUST APPARATUS

CROSS REFERENCE TO RELATES APPLICATION

This application is a Continuation-in-Part application of U.S. patent application Ser. No. 08/141,408, filed Oct. 22, 1993, now U.S. Pat. No. 5,542,249.

BACKGROUND OF THE INVENTION

The invention relates to the field of combustion engines and, particularly, to an exhaust apparatus for placement in the exhaust stream of a combustion engine for improving the efficiency of the engine and for reducing pollutants in the exhaust stream.

Several devices have been disclosed with the purpose of improving operating efficiency and/or reducing pollutants in the exhaust gas issuing from a combustion engine, particularly the engine of an automobile or other vehicle.

U.S. Pat. No. 4,012,907 to Crayton discloses an example of such an apparatus for attachment to an exhaust pipe. The device comprises a generally tubular housing open at both ends and containing two blades rotatably mounted on an axle within the housing. The housing is larger than the exhaust pipe to which it is to be attached so that external air can enter the leading open end and contact the blades so as to drive the blades and operate the mechanism. Obviously, the drive structure of this device results in openings in the exhaust conduit and the undesirable potential for flow out of the exhaust pipe, particularly when the vehicle to which the device is attached is not moving. Further, the device must apparently be positioned at the end of the exhaust pipe.

It is desirable to provide an apparatus which effectively provides drive of a fan without breaking the integrity of the exhaust conduit, and which enhances removal of pollutants from the exhaust stream.

It is therefore the primary object of the present invention to provide an apparatus for improving the efficiency of a combustion engine by improving the extraction of exhaust gas from the exhaust system of the engine.

It is another object of the invention to provide such an apparatus which is partially driven by the exhaust gas stream of the engine.

It is still another object of the present invention to provide an apparatus with a simple and effective supplemental drive which serves to enhance scavenging of exhaust gasses from the combustion chamber.

It is a further object of the invention to provide such an apparatus which reduces the pollutants present in the exhaust stream.

It is a still further object of the invention to provide an apparatus as above which can readily be installed at a desired location of the exhaust system of a combustion engine, either as an after-market device or, alternatively, as a factory installed device.

Other objects and advantages will appear hereinbelow.

SUMMARY OF THE INVENTION

According to the invention, an exhaust apparatus is provided for positioning in the exhaust stream of a combustion engine. The apparatus includes a fan member driven by the exhaust stream and a source of air so as to form a low pressure zone between the apparatus and the combustion chamber of the engine and thereby to improve the removal or extraction of exhaust gasses from the combustion chamber.

Particularly, the exhaust apparatus is provided for use with a combustion engine having a combustion chamber and an exhaust pipe for conveying exhaust gas in an exhaust stream from the combustion chamber. According to the invention, the exhaust apparatus comprises fan means disposed downstream of the combustion chamber and substantially sealingly associated with said exhaust pipe and air inlet means for introducing air relative to said fan means whereby said fan means is driven by the exhaust stream and air so as to create an area of low pressure between the fan means and the combustion chamber whereby extraction of exhaust gas from the combustion chamber is facilitated.

Air inlet means provided according to the invention further serve to mix air with the exhaust gas and thereby reduce pollution.

BRIEF DESCRIPTION OF THE DRAWINGS

A detailed description of the preferred embodiments of the invention follows, with reference to the attached drawings, wherein:

FIG. 1 is a side schematic view of an apparatus according to the invention;

FIG. 4 is a top view of a fan member according to the invention;

FIGS. 4a–4c illustrate alternative embodiments of fan structures for use in accordance with the present invention;

FIG. 5 is an enlarged partially broken away side view illustrating an air inlet assembly according to the invention.

DETAILED DESCRIPTION

Figure 2:
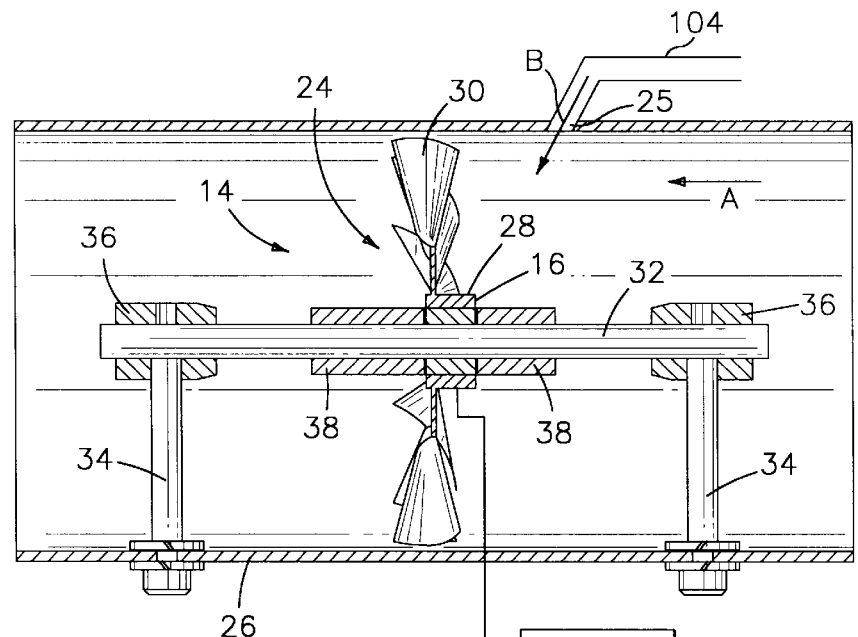
FIG. 2 is an enlarged side view of the fan assembly portion of an apparatus according to the invention.

The invention relates to an exhaust apparatus for improving the operation of a combustion engine and also for reducing pollutants in the exhaust gas stream issuing from the combustion engine. The apparatus is intended for use in the exhaust pipe of a combustion engine wherein the exhaust pipe conveys or carries exhaust gas from the combustion chamber of the engine to an outlet Typically, a combustion engine has an overlap period wherein the intake valve for injecting fuel into the combustion chamber and the exhaust valve for removing exhaust gasses from the combustion chamber are both open. This overlap is provided so that the injection of the fuel assists in forcing exhaust out of the combustion chamber. However, with this configuration, the intake charge of injected fuel can be diluted with exhaust which may result in a situation of less potential power and greater potential pollution. With the apparatus of the present invention, extraction of exhaust gas from the combustion chamber is improved by reducing the pressure into which the gasses flow, thereby avoiding the need to overlap the opening of both intake and exhaust valves as set forth above.

Referring now to FIG. 1, the apparatus of the present invention is generally referred to in the drawings with reference numeral 10. As will be described, apparatus 10 serves to create a low pressure zone between apparatus 10 and the combustion chamber 18 of the combustion engine (not shown in the drawings) so as to improve the flow of exhaust gasses out of the combustion chamber 18 and through the exhaust system, thereby improving operating efficiency of the combustion engine.

According to another aspect of the invention, an air inlet is provided for introducing air into the exhaust system and mixing the air with the typically very hot exhaust gas of the exhaust stream to allow further combustion or reduction of fuels and/or pollutants in the exhaust stream, thereby reducing pollution caused by the engine. Further, air is also directed in a stream into the vicinity of a fan member 14 positioned downstream of chamber 18 so as to drive fan member 14 and thereby provide the desired reduction in upstream pressure and enhance extraction of exhaust gases from combustion chamber 18.

Referring now to the drawings, preferred embodiments of the invention and their operation as above will be described.

FIG. 1 illustrates various elements of apparatus 10 disposed for use in an exhaust pipe 12 of a combustion engine (not shown). Exhaust pipe 12 is typically connected to a manifold which is connected, through individual conduits, to the various combustion chambers of the combustion engine. A fan assembly 14 is positioned in or along exhaust pipe 12, or sealably associated with exhaust pipe 12, so that the exhaust stream carried by exhaust pipe 12 and air flow from air inlet line 104 drive the fan of fan assembly 14 as will be more fully described below. A static mixer 20 may optionally be positioned within exhaust pipe 12 and upstream of fan assembly 14. An air inlet assembly 22 may also preferably be positioned upstream of fan assembly 14 and static mixer 20.

Referring now to FIG. 2, various elements of fan assembly 14 will be described. Fan member 24 is preferably rotatably positioned within a tubular housing 26. Fan 24 preferably includes a hub 28 and a plurality of blades 30 extending from hub 28. Hub 28 may be rotatably positioned on an axle member 32 which is positioned substantially coaxially with tubular housing 26. Axle 32 may be supported on at least one, preferably two or more support members or shafts 34 as shown, with collar members 36 providing connection between shafts 34 and axle 32, and locating collars 38 fixed to axle 32 on either side of hub 28 to maintain axial position of fan 24. Hub 28 may preferably have a bushing 16 disposed therein. Bushing 16 provides a surface for interacting with axle 32. In this regard, axle 32 and bushing 16 are preferably made of materials which allow free rotation of bushing 16 and hub 28 relative to axle 32, preferably with a minimal amount of friction and wear. Carbide bushings and axle materials, for example, are particularly suitable for this purpose, and some or all of the elements may be further coated with one or more conventional friction reducing materials as desired so as to further reduce friction and wear. Shafts 34 may be fixed to tubular housing 26 through any conventional means so as to provide rigid and secure positioning of fan 24. For example, shafts 34 may be connected to the wall of housing 26 and held in position in the wall by washers and locking nuts or any other means including but not limited to numerous mechanical fasteners, welding and the like. Preferably, the various connections between housing 26, shafts 34 and axle 32 are threaded or otherwise easily releasable so that apparatus 10 may be serviced if required.

In accordance with the invention, a stream of fluid, especially a gas such as air, is introduced into the vicinity of fan 24 so as to drive or facilitate rotation of fan 24. As shown in FIG. 2, an inlet 25 may be positioned within or mounted to the wall of tubular housing 26 or exhaust pipe 12 and oriented relative to fan 24 to drive same. Inlet 25 may be positioned in a wide variety of positions or arrangements to provide the desired drive. For example, inlet 25 may be angled as shown in FIG. 2 to introduce air (Arrow B) at least partially in the same general direction as the exhaust flow (Arrow A), or may be introduced at an angle with respect to the axis of exhaust pipe 12 or housing 26, preferably at an angle of between about 30° to about 90°. Air introduced through inlet 25 according to the invention serves to increase rotation speed of fan 24 to a faster speed than would be accomplished with exhaust alone, thereby creating a reduced pressure zone upstream of fan 24 as desired and helping to extract exhaust gas from combustion chamber 18.

Tubular housing 26 according to one embodiment is preferably a separate section of tube or pipe which can be installed at any desired point along exhaust pipe 12, for example with adaptor collars 40 (See FIG. 1). In this manner, tubular housing 26 can be readily removed for servicing. Tubular housing 26 may suitably have the same general diameter as exhaust pipe 12, or may be provided with an adapter (not shown) to adapt to different diameter exhaust pipes, in any event with tubular housing 26 preferably being substantially sealingly connected to exhaust pipe 12.

In accordance with the foregoing, apparatus 10 may be provided as a unitary add on device for connection, as is, to an existing exhaust pipe 12. Of course, fan 24 could alternatively be mounted within exhaust pipe 12 itself either during or after manufacture of the vehicle, engine, etc. Fan 24 is mounted in a freely rotating fashion and is positioned in exhaust pipe 12 so that the exhaust stream carried by the exhaust pipe supplemented by air from inlet 25 drives or rotates fan 24. Fan 24 thereby advantageously forms a low pressure area between fan 24 and combustion chamber 18 which serves to improve the draw of exhaust from the combustion chamber 18 of the combustion engine and thereby to improve operating efficiency of the engine.

Figure 3:
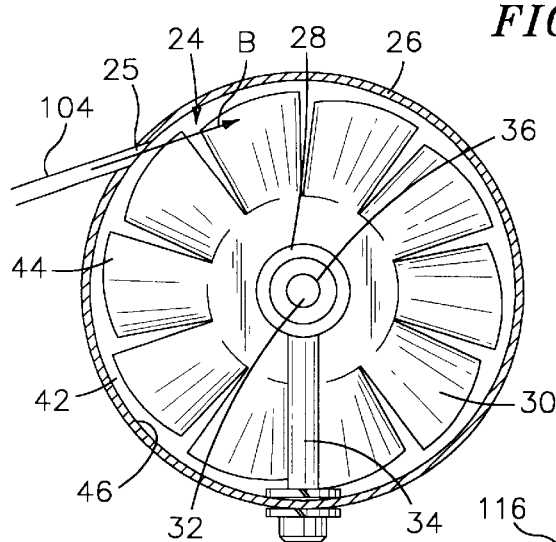
FIG. 3 is an end view of the apparatus of FIG. 2.

FIG. 3 shows an end view of fan 24 disposed within housing 26 in accordance with the invention. Fan 24 has a plurality of preferably equally spaced blades 30. Blades 30 are positioned so as to be driven by the exhaust stream from the combustion chamber 18 and air from inlet 25 so as to create the desired low pressure area between combustion chamber 18 and fan 24. At least three blades 30 are suitable in accordance with the present invention. Ten blades as shown are preferable and have been found to provide an excellent drive of fan 24 by the exhaust stream and air while imposing a minimal obstruction to the flow of the exhaust stream. Blades 30 have a length selected so as to provide a small clearance 42 between blade tips 44 and the inside surface 46 of tubular housing 26 so as to maximize the driving force of the exhaust stream on fan 24. In this regard, tubular housing 26 is also preferably provided having a diameter which is similar to that of exhaust pipe 12. In FIG. 3, inlet 25 is arranged to introduce air (Arrow B) substantially tangentially to a wall of housing 26 so as to impact blades 30 in the direction of rotation of same and thereby enhance drive of fan 24 as desired in accordance with the invention.

FIG. 4 shows a top view of fan 24 so as to illustrate the preferred shape and orientation of blades 30 on hub 28. As shown, fan 24 has a general overall plane X which is substantially perpendicular to axle 32. Blades 30 are oriented at an angle to plane X, and are also preferably curved in cross section so as to provide a concave surface 48 on one side of blade 30 and a convex surface 50 on the other side of blade 30. Blades 30 are preferably oriented so that a general plane Y of each blade 30 is disposed at an angle Z to plane X of between about 30 to about 60 degrees. Fan 24 is preferably positioned within housing 26 so that convex surfaces 50 of blades 30 face upstream and concave surfaces 48 face downstream. This orientation of concave and convex surfaces helps to maximize the drive of the exhaust stream and air imparted to fan 24 and thereby to enhance the reduction in pressure created by fan 24. Blade tips 44 are also preferably arcuate in shape so as to substantially conform to the inside surface 46 of housing 26.

It should also be noted that blades 30 may be oriented at angles to either side of plane X so as to provide for rotation in either a clockwise or counter clockwise manner as desired, and that either orientation is certainly within the scope of the present invention.

FIG. 4a illustrates an alternative structure for fan 24a wherein a ring member 27 is positioned around the tips 44 of fan blades 30. In this embodiment, ring 27 is preferably sized to minimize clearance between ring 27 and the inside diameter 46 of housing 26, while blades 30 extend to full contact with ring 27, thereby maximizing air and exhaust flow through, rather than around, blades 30 as desired. Ring 27 also serves to structurally strengthen fan 24a so as to reduce the possibility of need for servicing apparatus 10.

A number of fans 24 may be used, if desired, and fans 24 may have any suitable structure and as used herein, the term fan includes turbines, rotors and/or paddle wheels as well as conventional fan blades and the like.

FIG. 4b illustrates a further alternative embodiment of the invention wherein a separate paddle wheel structure 29 is positioned to be driven by air from an inlet 25a which may be used independently or in connection with inlet 25 for driving fan 24. As shown, paddle wheel 29 according to this embodiment is preferably positioned with fan 24 on axle 32 so that air drive of paddle wheel 29 enhances rotation speed of fan 24 as desired. Paddle wheel 29 may suitably be mounted to axle 32 through a bushing as shown in FIG. 4b or through some other structure as desired.

FIG. 4c shows still another embodiment wherein a paddle wheel structure 31 is positioned around the perimeter of fan 24b for enhanced drive by air from inlet 25 in accordance with the invention.

In the embodiment of FIGS. 4b and 4c, paddle wheels 29, 31 may suitably be provided as a plurality of paddles positioned as desired in a plane preferably substantially parallel to the axis of housing 26 or pipe 12.

According to the invention, static mixer 20 (FIG. 1) may optionally be provided so as to impart a swirling flow to the gasses of the exhaust stream and also to improve the mixture of air from air inlet assembly 22 with the exhaust gas. Static mixer 20 preferably comprises a baffle or coil or other flow directing structure which is disposed in exhaust pipe 12 upstream of fan member 24. The baffle structure may suitably be a series of angled plates positioned so as to impart a swirling motion to the stream of exhaust gasses as the stream flows by mixer 20. The plates are preferably angled so as to present a minimal obstacle to flow of the exhaust gas stream. The swirling motion serves to improve the drive of fan 24 by the exhaust stream. Of course, any conventional and/or known structure could similarly be used for providing the desired swirling flow and mixing. Static mixer 20 may preferably be between about 2 to about 30 inches in length, more preferably about 3 to about 9 inches depending upon the engine and exhaust system in question. It is also noted that static mixer 20 may serve to provide an additional reduction in sound or engine noise issuing from the exhaust system.

FIG. 5 illustrates air inlet assembly 22 in accordance with the invention. As shown, an inlet 52 for air is provided which passes through the wall of exhaust pipe 12. An injector 54 is preferably positioned in inlet 52. Injector 54 is preferably a substantially tubular structure communicating at one end 56 with a source of air which may also be the source of air for inlet line 104 to inlet 25. The other end is preferably a tube member 58 which extends into exhaust pipe 12. A downstream portion of tube member 58 is cut away or removed so that air can flow from the air source into exhaust pipe 12. Positioning of the opening 60 or cut away portion of tube member 58 facing open downstream in exhaust pipe 12 serves to draw air into exhaust pipe 12 with a venturi type flow and also minimizes the interference in flow of the exhaust stream which might be caused for example by an opening facing upstream into the exhaust gas stream. Air is drawn into exhaust pipe 12 through air inlet 52 by the low pressure zone created by fan 24.

It has been found that, when the combustion engine is operating at slower or idling speeds, air inlet 52 may allow exhaust gas to exit or escape through inlet 52. Since this is undesirable, air inlet assembly 22 also preferably includes a check valve 62 (shown schematically in FIG. 5) positioned so as to block all flow out of inlet 52, and to open for flow into inlet 52, preferably only upon reduction of pressure downstream of check valve 62 to a desired level at which check valve 62 opens to allow air flow into exhaust pipe 12. Check valve 62 may be any structure suitable to provide desired one-way flow. Of course, the actual structure of the check valve forms no part of this invention, and numerous conventional check valves or one-way valves are available which are suitable for use with the invention.

Inlet 25 is also preferably provided with a check valve 62 as described above, and if inlet 25 and injector 54 are fed from a common line, such as line 70, (FIG. 1) check valve 62 could be positioned in line 70 to protect against back flow in both cases.

In order to improve air flow to air inlet assembly 22 and inlet 25, an air collector 66 may be provided having an open end 68 and being connected to injector 54 through check valve 62 via hose 70 or any other desired conduit. Collector 66 may typically be a funnel, scoop or other structure which serves to collect and channel air into hose 70. Collector 66 is preferably oriented so as to face into a flow of air. For example, collector 66 may be positioned facing forward on a vehicle so that forward motion of the vehicle serves to force air into collector 66. In this regard, check valve 62 is preferably opened by a pressure difference between the air source or upstream side of check valve 62 and the inside area of exhaust pipe 12. Collector 66 serves to drive air toward the upstream side of check valve 62 and thereby to increase the pressure difference so as to provide proper opening of the valve when desired. Collector 66 may also advantageously serve to drive air to inlet 25 for enhanced drive of fan 24 as desired in accordance with the invention.

It should also be noted that while air is desirable as a fluid to be fed to assembly 22 and inlet 25, other fluids or gases could be substituted within the scope of the present invention. Further, while collector 66 is disclosed for use in collecting and forcing air to assembly 22 and inlet 25, air could be provided differently for example through a compressor or pump or other source of air/fluid under pressure, all in accordance with the present invention. Further, fluid introduced through inlet 25 may be a stream of exhaust gas separated upstream and introduced relative to fan 24 as desired to enhance and drive rotation of fan 24.

Figure 6:
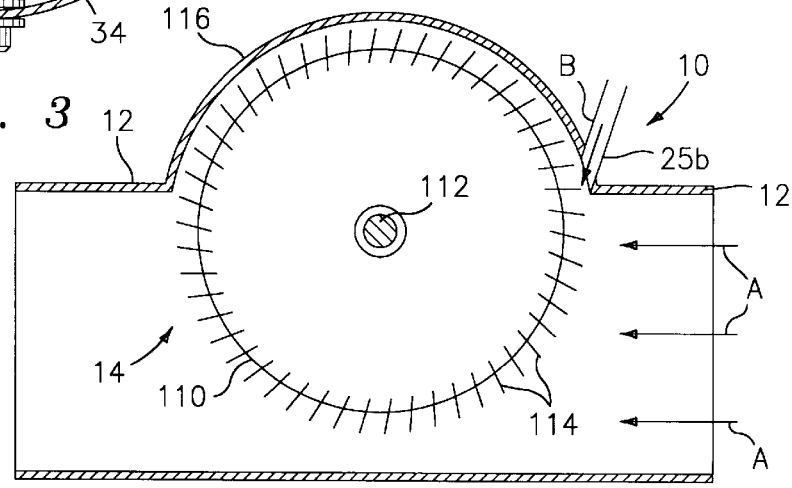
FIG. 6 is a side schematic view of a further alternative embodiment of the invention.

Referring now to FIG. 6, a further alternative embodiment of the invention is illustrated. As shown, fan member 14 may be provided as a paddle wheel structure 110 rotatably mounted to an axle 112 positioned substantially perpendicular with respect to the longitudinal axis of exhaust pipe 12. Axle 112 is preferably arranged so as to position a portion of paddle wheel structure 110 within exhaust stream (Arrows A) carried by exhaust pipe 12, and inlet 25b is preferably positioned so as to introduce air (Arrow B) into contact with paddle wheel structure 110 so as to drive same. In accordance with this embodiment of the invention, paddle wheel structure 110 is therefore driven to rotate around axle 112 by the exhaust stream and by air from inlet 25b so as to rotate faster than would be caused by the exhaust stream alone, thereby creating a low pressure zone upstream of paddle wheel structure 110 and serving to enhance removal of exhaust gases from combustion chamber 18 as desired.

In this embodiment of the invention, paddle wheel structure 110 may suitably have a plurality of vanes or slats 114 arranged substantially parallel to axis 112 and oriented relative to inlet 25b and the direction of flow of exhaust within exhaust pipe 12 so that paddle wheel structure 110 is driven as desired by flow of air and exhaust. Although the disclosure of this embodiment is with respect to a paddle wheel structure 110, it should be noted that alternative structures for fan member 14 could be employed in this embodiment having axle 112 substantially perpendicular to the longitudinal axis of exhaust pipe 12 if desired.

In further accordance with this embodiment, paddle wheel structure 110 and axle 112 are preferably mounted within a housing 116 which may extend outwardly from the profile of exhaust pipe 12, if desired, so as to accommodate rotation of paddle wheel structure 110 without interfering with the integrity of the exhaust conduit through which exhaust gases flow.

Referring now back to FIG. 1, the operation of apparatus 10 according to the invention will be further discussed. Operation of apparatus 10 begins when the engine is started. As the engine idles at a relatively slow speed, a correspondingly small amount of exhaust gas is generated. The exhaust gas flows from combustion chamber 18 in the direction of arrow A past closed air inlet assembly 22 and into static mixer 20, if present. Mixer 20 imparts a swirling flow to the gas. The swirling gas flows to fan 24, where the force of the gas together with air from inlet 25 impacting upon blades 30 of fan 24 causes rotation of fan 24. Air from inlet 25 rotates fan 24 more rapidly than would be caused by the exhaust stream alone so that fan 24 reduces pressure upstream and creates a low pressure zone between combustion chamber 18 and fan 24. The low pressure zone so generated serves to draw or extract exhaust gas from the combustion chamber, thereby improving the operation of the combustion engine. Forward motion of the vehicle drives air into collector 66 and against the upstream side of check valve 62 as well as into inlet 25. When the upstream/downstream pressure difference relative to check valve 62 surpasses a desired level, check valve 62 opens and air is drawn and/or forced into exhaust pipe 12 through injector 54. Also, increasing amounts of air from collector 66 result in additional drive of fan 24 as desired. The resistance of check valve 62 is preferably set so that the valve will open when the pressure difference is large enough to ensure that back flow of exhaust gas out of inlet 52 is prevented. Incoming air mixes with the exhaust gas, especially while passing through static mixer 20. Mixture of air with the exhaust gas at the elevated temperatures of the exhaust gas stream serves to further combust or reduce pollutant materials carried by the exhaust gas. Thus, a combustion engine equipped with an apparatus according to the invention exhibits increased fuel efficiency and provides an exhaust gas stream having reduced pollutants.

With engines having a small displacement and/or with engines which spend a relatively large amount of time at idle speeds, it may be desirable to supplement the exhaust drive of fan 24 with additional motive means. FIG. 2 also illustrates an alternate embodiment of the invention wherein additional motive means 100 are provided. The additional motive means may of course be any conventional motive means such as an electric motor, a belt drive to a moving part of the engine, or any other conventional means which may be desired. The additional motive means 100 does not replace the exhaust drive, but rather is a supplement to it. Further, additional motive means 100 may be positioned at any desired location inside or outside, preferably outside, of tubular housing 26 as desired. Additional motive means 100 may include belt connections to fan 24 or some other drive mechanism which must pass through exhaust pipe 12 or tubular housing 26. If this is the case, apparatus 10 is preferably positioned downstream of the muffler and other operative elements of the exhaust system so as not to interfere with proper operation of the exhaust system. It is desirable that such a supplemental drive be operable to accelerate when the combustion engine accelerates so that the full efficiency and pollutant benefits of the invention can be realized. Drives associated by belts with moving parts of the engine will, of course, accelerate with the engine. Electric motors, especially brushless motors, may advantageously be tied in to the throttle switch of a typical vehicle having a combustion engine so as to provide acceleration of the electric motor with the combustion engine as desired.

The apparatus 10 according to the invention may be positioned at any desired location along the exhaust system of the engine. FIG. 1 shows apparatus 10 positioned upstream of the muffler 102. Apparatus 10 may also preferably be positioned downstream of the catalytic converter (not shown). This positioning is advantageous because apparatus 10 in such a position also improves operation of the catalytic converter by improving the flow of exhaust gas therethrough. Furthermore, various elements of apparatus 10 may be positioned at different locations along exhaust pipe 12 as desired. For example, air inlet assembly 22 may be positioned at any convenient location in the exhaust system, preferably at or upstream of fan 24.

It should be noted that a plurality of fan assemblies 14, mixers 20 and/or air inlet assemblies 22 could be utilized in series in the exhaust system in accordance with the present invention.

Also as shown in FIG. 1, an air inlet 104 (shown schematically) may be positioned so as to introduce a stream of air into exhaust pipe 12 in a direction selected to drive fan 24 such as, for example, a direction substantially angular to a longitudinal axis of exhaust pipe 12 in the general vicinity of fan 24 and preferably offset from the central axis (see FIG. 3), so as to impart a swirling flow or otherwise impact upon fan 24 to drive fan 24 as desired.

Air may be fed to air inlet 104 and inlet 25 via collector 66 or any other means as desired such as, for example, an additional collector, an air compressor or pump, a temporary or short term supply of air under pressure and the like. It should also be noted that air inlet 104 may be included either in addition to or in place of air inlet assembly 22. In this regard, air introduced at fan 24 would serve to further combust and/or reduce potential pollutants in the exhaust gas stream as thoroughly described above with reference to air inlet assembly 22.

Thus disclosed is an apparatus for the exhaust system of a combustion engine which improves the efficiency of the engine and also reduces the pollutants contained in the exhaust gas stream.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. An exhaust apparatus for a combustion engine having a combustion chamber and an exhaust pipe having an inner space for conveying exhaust gas in an exhaust stream from the combustion chamber, the exhaust apparatus comprising a fan disposed downstream of the combustion chamber and substantially sealingly associated with said exhaust pipe, air inlet means for introducing air to said exhaust stream upstream of said fan, and a normally closed check valve associated with the air inlet means and opened by an increase in pressure differential between the source of air and the inner space whereby backflow from the exhaust pipe out of the air inlet means is prevented.

2. An apparatus according to claim 1, wherein the fan comprises an axle disposed within the exhaust pipe and a fan member comprising a hub rotatably mounted to the axle and a plurality of fan blades extending radially from the hub.

3. An apparatus according to claim 2, wherein said fan member further comprises a ring member positioned around outer edges of said fan blades and having an outside diameter adapted to rotate freely with respect to an inner diameter of said exhaust pipe whereby flow through said fan blades and structural strength of said fan blades are enhanced.

4. An apparatus according to claim 2, wherein said fan further comprises additional fan positioned on said axle for being driven by air from said air inlet means.

5. An apparatus according to claim 4, wherein said additional fan comprises a paddle wheel structure having paddles arranged in planes substantially parallel to said longitudinal axis of said exhaust pipe.

6. An apparatus according to claim 2, further comprising a paddle wheel structure positioned around said fan member and having paddles arranged in planes substantially parallel to said longitudinal axis of said exhaust pipe.

7. An apparatus according to claim 1, wherein the fan comprises an axle disposed within a housing and a fan member comprising a hub rotatably mounted to the axle and a plurality of fan blades extending radially from the hub, wherein the housing is adapted for substantially sealing connection to the exhaust pipe at a desired location.

8. An apparatus according to claim 7, wherein the housing is substantially tubular in shape.

9. An apparatus according to claim 7, wherein said fan member further comprises a ring member positioned around outer edges of said fan blades and having an outside diameter adapted to rotate freely with respect to an inner diameter of said housing whereby flow through said fan blades and structural strength of said fan blades are enhanced.

10. An apparatus according to claim 7, wherein said fan further comprises an additional fan positioned on said axles means for being driven by air from said air inlet means.

11. An apparatus according to claim 10, wherein said additional fan comprises a paddle wheel structure having paddles arranged in planes substantially parallel to a longitudinal axis of said housing.

12. An apparatus according to claim 7, further comprising a paddle wheel structure positioned around said fan member and having paddles arranged in planes substantially parallel to a longitudinal axis of said housing.

13. An apparatus according to claim 1, wherein the air inlet means further includes means for introducing air into an inner space of the exhaust pipe so as to react with pollutants contained in the exhaust stream.

14. An apparatus according to claim 1, further including means for introducing air to the air inlet means.

15. An apparatus according to claim 14, wherein the apparatus is positioned on a vehicle and wherein the means for introducing air comprises a collector having an open end facing forward on the vehicle for collecting air and conduit means for conveying air from the collector to the air inlet means whereby, when the vehicle is in motion, air is collected by the collector and fed through the conduit means to the air inlet means.

16. An apparatus according to claim 1, wherein the air inlet means is positioned so as to introduce a stream of air relative to the fan at an angle to a longitudinal axis of the exhaust pipe and offset from the axis whereby said stream of air drives said fan.

17. An apparatus according to claim 1, wherein the fan comprises an axle member arranged substantially perpendicular to an axis of said exhaust pipe, wherein said fan member comprises paddle wheel means rotatably mounted on said axle, and wherein said air inlet means introduces air relative to said paddle wheel means whereby said paddle wheel means is driven by said air so as to create said area of low pressure.

18. An exhaust apparatus according to claim 1, wherein the fan comprises a plurality of fan blades extending radially, and wherein said fan blades are positioned entirely within the exhaust stream.

19. An exhaust apparatus for a combustion engine having a combustion chamber and an exhaust pipe for conveying exhaust gas in an exhaust stream from the combustion chamber, the exhaust apparatus comprising a fan disposed downstream of the combustion chamber and substantially sealingly associated with said exhaust pipe, and means for driving said fan so as to create an area of low pressure between the fan and the combustion chamber whereby extraction of exhaust gas from the combustion chamber is facilitated.

20. An apparatus according to claim 19, further comprising a normally closed check valve associated with the air inlet means and opened by an increase in a pressure differential between the source of air and the inner space whereby back flow from the exhaust pipe out of the air inlet means is prevented.

21. A method for operating a combustion engine having a combustion chamber and an exhaust pipe for conveying exhaust gas in an exhaust stream from the combustion chamber, comprising the step of:

providing an exhaust apparatus comprising a fan and means for driving the fan;

positioning the exhaust apparatus on the exhaust pipe so as to sealingly associate the fan with the exhaust pipe; and operating the means for driving so as to create an area of low pressure between the fan and the combustion chamber whereby extraction of exhaust gas from the combustion chamber is facilitated.

* * * * *